(12) United States Patent
Moxon

(10) Patent No.: US 9,815,559 B2
(45) Date of Patent: Nov. 14, 2017

(54) AIRCRAFT

(71) Applicant: ROLLS-ROYCE plc, London (GB)

(72) Inventor: Matthew Moxon, Derby (GB)

(73) Assignee: ROLLS-ROYCE plc, London (GB)

( * ) Notice: Subject to any disclaimer, the term of this patent is extended or adjusted under 35 U.S.C. 154(b) by 153 days.

(21) Appl. No.: 14/976,414

(22) Filed: Dec. 21, 2015

(65) Prior Publication Data
US 2016/0207630 A1    Jul. 21, 2016

(30) Foreign Application Priority Data

Jan. 21, 2015    (GB) .................................. 1500996.2

(51) Int. Cl.
| | | |
|---|---|---|
| *B64D 27/10* | (2006.01) | |
| *B64D 27/02* | (2006.01) | |
| *B64D 27/14* | (2006.01) | |
| *B64C 39/10* | (2006.01) | |

(52) U.S. Cl.
CPC .............. *B64D 27/10* (2013.01); *B64C 39/10* (2013.01); *B64D 27/02* (2013.01); *B64D 27/14* (2013.01); *B64C 2039/105* (2013.01)

(58) Field of Classification Search
CPC ........ B64D 27/10; B64D 27/02; B64D 27/14; B64C 39/10
See application file for complete search history.

(56) References Cited

U.S. PATENT DOCUMENTS 3,330,502 A * 7/1967 Colville ................ B64C 29/005
239/265.27
5,131,605 A * 7/1992 Kress .................. B64C 29/0075
244/12.4
2015/0121838 A1* 5/2015 Suciu ..................... B64D 27/20
60/39.15

FOREIGN PATENT DOCUMENTS

| DE | 11 61 765 B | 1/1964 |
| DE | 19840711 | * 6/1999 |
| DE | 19840711 A1 | 6/1999 |
| EP | 2 878 538 A1 | 6/2015 |
| FR | 1314597 | * 1/1963 |
| FR | 1314597 A | 1/1963 |
| FR | 2965250 A1 | 3/2012 |

OTHER PUBLICATIONS

Jun. 23, 2015 Search Report issued in British Patent Application No. 1500996.2.
Liebeck, "Design of the Blended Wing Body Subsonic Transport," Journal of Aircraft, vol. 41, No. 1, pp. 10-25, Jan.-Feb. 2004.
Jun. 2, 2016 Search Report issued in European Patent Application No. 15 20 1624.

* cited by examiner

*Primary Examiner* — Justin M Benedik
(74) *Attorney, Agent, or Firm* — Oliff PLC

(57) ABSTRACT

An aircraft (2) comprises at least first and second gas turbine engines (10*a*, 10*b*) arranged in a line extending generally normally to an aircraft longitudinal axis (A), each engine (10*a*, 10*b*) comprising at least one compressor or turbine rotor disc (32-42) defining a respective rotational plane ($D_{32}$-$D_{42}$). The rotational plane ($D_{32}$-$D_{42}$) of at least one of the rotors (32-42) of at least one of the engines (10*a*, 10*b*) is angled relative to the aircraft longitudinal line (A) such that a burst disc plane of the respective engine (10*a*, 10*b*) is nonintersecting with another engine (10*a*, 10*b*).

6 Claims, 1 Drawing Sheet

AIRCRAFT

FIELD OF THE INVENTION

The present invention relates to an aircraft, particularly though not exclusively, to a blended wing body aircraft having multiple engines located at a trailing edge of the aircraft.

BACKGROUND TO THE INVENTION

Blended wing body aircraft are known in which the fuselage and wings are integrated such that there is no clear dividing line between the wings and fuselage. The body may therefore contribute to lift, increasing the efficiency of the aircraft. In a "flying wing" design, the fuselage is omitted, with the pilot, passengers and engines provided within the wing.

One known blended wing body study is described in Liebeck, R. H. "Design of the Blended Wing Body Subsonic Transport." AIAA Journal of Aircraft, Volume 41, Issue 1, January-February 2004, pp. 10-25. Blended wing body and flying wing configurations are also known in which the engines are mounted within the wing (such as the Northrop B2). Trade studies have shown that such a design is most suitable for relatively large, long range aircraft.

Gas turbine engines are highly efficient, and have high thrust to weight ratios. However, some failure modes of gas turbine engines can cause extensive damage to safety critical aircraft components such as other engines, fuel tanks, hydraulic and electrical control runs, and aircraft propulsors in the case of a distributed propulsion aircraft. For example, the uncontained rupture of a compressor or turbine rotor disc can, in some cases, lead to the destruction of adjacent engines, fires in fuel tanks, or severance of hydraulic or electrical control runs, which may lead to loss of control. Consequently, in most conventional aircraft, the engines are spaced far apart (either by locating engines spaced on the wing, or by locating one or more engines in the tail of the aircraft) and physically distant from safety critical aircraft components, thereby reducing the risks of damage to other safety critical aircraft components in the event of an uncontained disc rupture event. Alternatively, the engines may be surrounded by relatively heavy and expensive containment structures to prevent uncontained failures from occurring.

However, it is desirable to locate both the wings and engines close to the centre of mass of the aircraft, since the engines represent a large proportion of the mass of the aircraft, and locating the wings (and so the centre of lift) close to the centre of mass reduces trim drag which would otherwise be necessary to cancel the torque produced in flight by the centre of lift/centre of mass mismatch. If the engines are installed within the fuselage, this leads to engines close to one another, as well as close to fuel tanks in the wings, and hydraulic and/or electrical control runs which pass from the cockpit to the aft of the aircraft. Such an arrangement, while aerodynamically and structurally efficient, leads to unacceptable aircraft risks in the event of an uncontained disc failure.

The present invention describes an aircraft which seeks to overcome some or all of the above problems.

SUMMARY OF THE INVENTION

According to a first aspect of the present invention, there is provided an aircraft having a longitudinal axis and comprising:
at least one gas turbine engine having a longitudinal axis and comprising at least one compressor or turbine rotor disc defining a respective rotational plane normal to the longitudinal axis, wherein the engine longitudinal axis is angled relative to the aircraft longitudinal axis such that a respective rotational plane of the respective engine is nonintersecting with one or more safety critical aircraft component; and
at least one duct arrangement comprising an intake duct leading from an air inlet to an intake of a respective engine, and an exhaust duct leading from an exhaust of the respective engine to an exhaust outlet, wherein the intake duct transitions from a direction generally parallel to the aircraft longitudinal axis at the air inlet, to a direction generally parallel to the respective engine longitudinal axis at the intake, and the outlet duct transitions from a direction generally parallel to the respective engine longitudinal axis at the exhaust of the respective engine, to a direction generally parallel to the aircraft longitudinal axis at the exhaust outlet.

Advantageously, the design freedom for aircraft engine placement is increased, since the engine can be placed at a longitudinal position close to safety critical aircraft components, without risking destruction of these components in the event of a disc burst event. The intake arrangement permits such an arrangement without significant reduction in engine efficiency, since inlet pressure is recovered by the intake arrangement, and the direction of thrust is redirected to the aircraft longitudinal line by the exhaust arrangement. This arrangement has been found by the inventor to permit aircraft designs having significantly lower weight, and/or higher aerodynamic efficiency compared to prior arrangements.

The one or more safety critical aircraft components may comprise one or more of a further gas turbine engine, a fuel tank, a hydraulic control run, an electrical control run, a passenger or crew compartment, and an aircraft propulsor.

The aircraft may comprise two or more gas turbine engines and associated duct arrangements, which may be arranged in a line extending generally normally to an aircraft longitudinal axis in the horizontal plane.

The one or more gas turbine engines may be arranged in a line substantially coincident with an aircraft centre of mass, and may be arranged in a line substantially coincident with an aircraft centre of lift. Advantageously, each of the aircraft centre of lift, engines and centre of mass can be substantially coincident, without risking damage to safety critical aircraft components in the event of a disc burst event.

The one or more gas turbine engines may be offset relative to the aircraft longitudinal axis in the horizontal plane.

The aircraft may comprise one of a blended wing body aircraft and a flying wing aircraft.

The engines may be located at a trailing edge of the fuselage of the aircraft, and may be mounted at a point of transition between the fuselage and wings. The engines may be located within the aircraft wing or fuselage.

The air inlet of the or each intake duct may be located at a leading edge of the point of transition between the fuselage and wings. Advantageously, the intake is located at a stagnation point of air passing over the aircraft, thereby increasing the static pressure of air entering the engine.

The aircraft may comprise at least two redundant control runs for at least one aircraft control surface, wherein one control run extends along a first side of an engine, and a further control run extends along a second side of the respective engine Advantageously, an uncontained disc failure (which will normally only produce a small number of relatively large fragments) is unlikely to sever both control runs in view of the large separation between redundant control runs.

DETAILED DESCRIPTION

Figure 1:
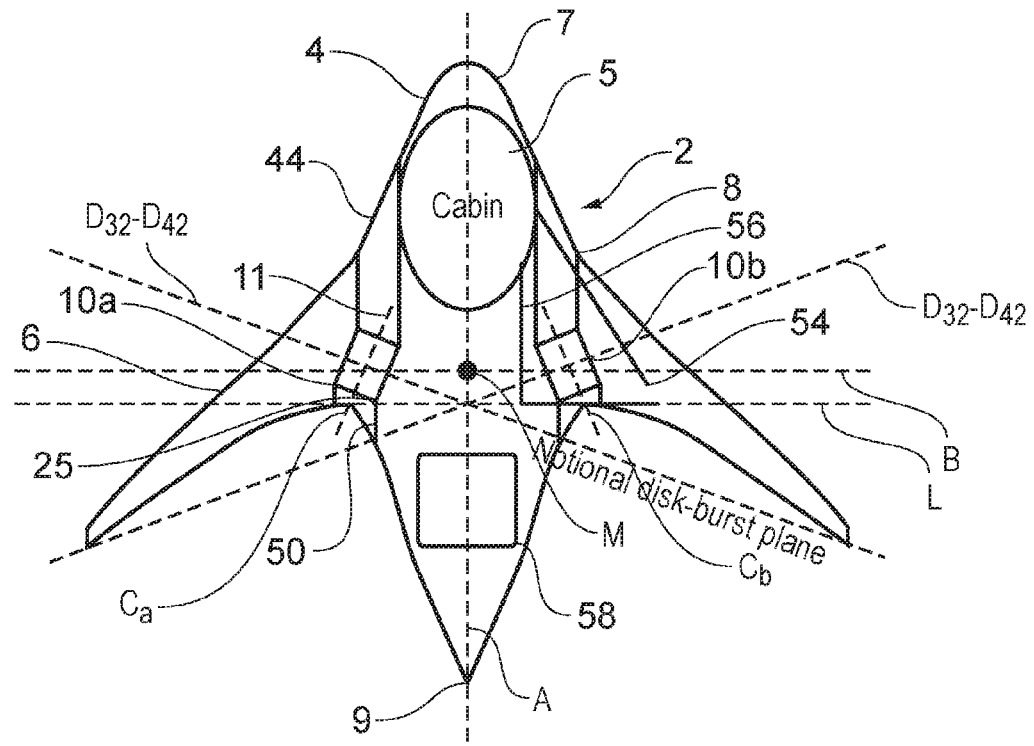
FIG. 1 shows a schematic plan view of an aircraft in accordance with the present disclosure; and I
Figure 2:
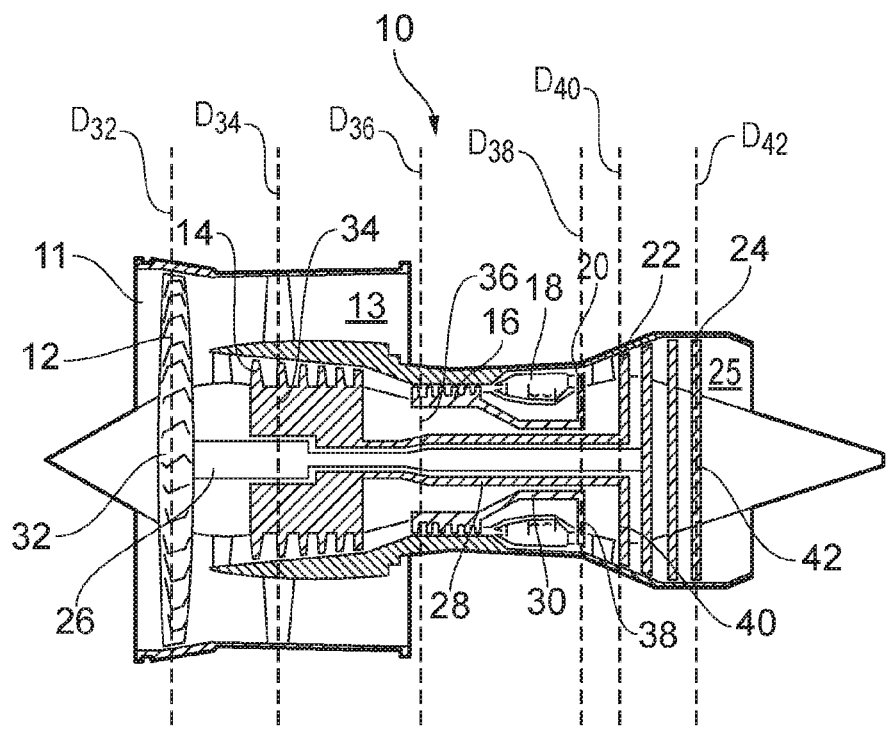
FIG. 2 shows a cross sectional schematic view of a gas turbine engine suitable for the aircraft of FIG. 1.

FIGS. 1 and 2 show an aircraft 2 in accordance with the present disclosure. The aircraft is in the form of a blended wing body (BWB) business jet aircraft of a size suitable for carrying up to 10 people.

The aircraft 2 includes a body 4 configured to carry passengers within a forward cabin section 5, wings 6 blended with the aircraft body, and engines 10a, 10b located on either side of the body 4. The cabin section 5 is oval when viewed from above. Such a configuration provides a structurally efficient pressure vessel for the passengers and crew, while providing a large internal volume. The cabin section 5 has a lower aspect ratio (i.e. ratio of length to width) than a conventional passenger cabin—this is thought to increase the productivity of the space, since passengers can face one another. The aft fuselage volume can be utilised for non-passenger cabin aircraft internal volume requirements, such as avionics, unpressurised or pressurised cargo or luggage space, and fuel tanks 58. The aircraft wings 6 are relatively high aspect ratio, and provide a portion of the lift for the aircraft 2 in flight, the remainder of the lift being provided by the body 4, which is of a "lifting body" configuration, being aerofoil shaped, and smoothly transitioning to the wings 6 at a transitioning portion 8. The body 4 defines an aircraft longitudinal axis A which extends from a nose 7 of the aircraft to a tail 9. A lateral axis B extends through a centre of mass M, normally to the aircraft longitudinal axis A in the horizontal plane. In the described example, the aircraft is a "business jet" type aircraft configured to carry approximately 10 or fewer passengers. The described aircraft has a wing span of approximately 40 m, a length of approximately 33 m, and a fuselage height of approximately 3.3 m. The oval passenger cabin 5 has an internal length of approximately 9 m, and an internal width of approximately 7 m.

The engines 10a, 10b are located at a trailing edge of an outer portion of the body 4 at the transitioning portion 8, either side of the aircraft longitudinal axis A, and so the engines 10a, 10b are offset from the aircraft longitudinal centre line A. The engines 10a, 10b are each in the form of a gas turbine 10. The engine 10 is shown in FIG. 2 and comprises, in axial flow series, an intake 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine. By positioning the engines 10 within the relatively thick outer portion of the body, sufficient space is provided to install an engine 10 having a relatively large fan diameter, and thus high bypass ratio. Such engines are generally more efficient than low bypass ratio engines at high subsonic speeds. On the other hand, this area is too thin to provide sufficient headroom for passengers, so would be otherwise wasted.

Air is drawn in through the intake by the fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 and generates the remaining portion of the engine 10 thrust.

The fan 12, compressors 14, 16 and turbines 20, 22, 24 each comprise a plurality of blades affixed to respective discs 32-42. Each of these discs 32-42 rotate at a high speed. In the event of failure of one of these discs, fragments of the respective failed disc 32-42 may not be contained within the engine 10, and may therefore exit the engine 10 at high velocity, which may cause damage to adjacent components. This therefore imposes a minimum spacing requirement for the engines 10, and may necessitate relatively heavy, bulky and expensive containment systems for the engines 10.

Referring again to FIG. 1, the engines 10a, 10b have respective longitudinal axes $C_a$, $C_b$, which extend from the respective engine intake 11 to the respective exhaust nozzle 25. Each disc 32-42 rotates about the respective engine longitudinal axis C, and so defines a respective rotational plane $D_{32}$-$D_{42}$ extending normally to the engine longitudinal axis C. FIG. 2 shows the rotational plane $D_{38}$ for the high pressure turbine rotor 38 of each engine $10_a$, $10_b$. The respective rotational plane $D_{32}$-$D_{42}$ for each disc 32-42 represents the potential paths that fragments from the discs 32-42 may take in the event of an uncontained disc failure, and so represents a "burst disc plane".

The engines 10a, 10b are angled such that their longitudinal axes $C_a$, $C_b$, are non-parallel with the aircraft longitudinal axis A in the horizontal plane, i.e. the engines 10a, 10b are angled inwardly such that the respective intakes 11 are canted inward toward the aircraft nose 7. The engines 10a, 10b are canted inward to an extent such that at least some of the rotational planes $D_{32}$-$D_{42}$ of the engines 10a, 10b is nonintersecting with the other engine 10a, 10b, i.e. a notional line extending from one or more rotating components of the engine in a direction normal to the axis of rotation of the rotating components does not extend through the other engine 10a, 10b. Consequently, in the event of an uncontained disc failure, disc fragments from the engines 10a, 10b will not strike the other engine. In particular, it is desirable that the plane $D_{38}$ of the high energy, otherwise uncontained HP turbine disc 38 is nonintersecting with the other engine 10a, 10b. Consequently, safety critical aircraft components in the form of the engines 10a, 10b do not intersect the rotational planes $D_{32}$-$D_{42}$ of the other engines.

Fuel tanks are also regarded as safety critical aircraft components. Consequently, the fuel tank 58 is also located away from the rotational planes $D_{32}$-$D_{42}$ of the engines 10a, 10b, such that the rotational planes $D_{32}$-$D_{42}$ is nonintersecting with the fuel tank 58. Consequently, a disc burst event will not damage fuel tanks, which may otherwise lead to a fire. Further fuel tanks (not shown) can also be provided in the wings 5 between the rotational planes $D_{32}$-$D_{42}$ of the engines 10a, 10b without encountering a risk of damage in the event of a disc rupture. The cabin 5 is also located forward of the rotational planes $D_{32}$-$D_{42}$ of the engines 10a, 10b, and so fragments from a disc burst event will not enter the passenger cabin.

Since the engines 10a, 10b are angled such that their longitudinal axes $C_a$, $C_b$ do not correspond to the aircraft longitudinal axis A, any thrust generated by the engines 10a, 10b would be directed away from the direction of travel of the aircraft, leading to inefficiency. Consequently, the engines 10a, 10b are each located within a duct arrangement in the form of "S-ducts".

Referring again to FIG. 1, an intake duct 44 is provided for each engine 10a, 10b. The respective intake ducts 44 extend from a leading edge of the transition region 8 of the fuselage 4 to the engine intake 11. The intake duct 44 transitions from a direction generally parallel to the aircraft longitudinal axis A at an inlet to the intake duct, to a direction generally parallel to the respective engine rotational axis C at the engine inlet 11. The inlet duct 44 may transition smoothly between these directions, to avoid flow separation from the walls of the intake duct 44.

The duct arrangement further comprises an outlet duct 50 for each engine, which extends from the engine exhaust 25 to an exhaust outlet at the trailing edge of the transition region 8. Each outlet duct 50 transitions from a direction generally parallel to the respective engine longitudinal axis C at the exhaust nozzle 25, to a direction generally parallel to the aircraft longitudinal axis A at an exhaust of the outlet duct located at the trailing edge of the transition region 8. Consequently, the exhaust duct 50 ensures that air exhausted from the engine 10 is transferred in a direction substantially parallel to the aircraft longitudinal axis A, thereby ensuring optimum propulsive efficiency. The ducts 44, 50 are located within the aircraft body 2, in the transition section 8.

Hydraulic and electrical control runs are considered to be safety critical aircraft components. In order to further reduce the consequences of an uncontained disc failure, redundant first and second control runs 54, 56 are provided. In the example shown in FIG. 2, control runs 54, 56 comprising either hydraulic pipes or electrical cables are provided extending from the cabin 5 to a control surface such as an aileron (not shown) on the wing 4 outboard of the starboard engine 10b. The first control run 54 extends inboard of the engine 10b from the forward cabin 5 to a region downstream of the engine 10 near the trailing edge of the transition region 8 (i.e. past the rotational planes $D_{32}$-$D_{42}$ in an inboard side of the engine 10b), then extends outboard toward the aileron. On the other hand, the second control run 56 extends outboard of the engine 10b from the forward cabin 5 directly toward the aileron (i.e. past the rotational planes $D_{32}$-$D_{42}$ on an inboard side of the engine 10b). Consequently, the control runs 54, 56 are segregated either side of the engine 10b at the point where they pass the burst disc planes, and so they are unlikely to both be damaged by a burst disc event, since debris from a burst disc event tends to emanate from one side of the engine.

FIG. 1 also shows the centre of mass M of the aircraft. As can been seen, the engines 10a, 10b are located in a line B extending generally coincident with the aircraft centre of mass M. The wings 6 are also generally located extending either side of the aircraft centre of mass M, such that the centre of lift (which in this case is provided by both the wings 6 and fuselage 4) is also located at a longitudinal position generally coincident with the centre of mass M. Consequently, trim drag for the aircraft is minimised, since the centre of mass M and centre of lift L are close to one another. Due to the small amount of trim required, ailerons located at the trailing edge of the swept wings 6 may provide sufficient pitch authority (and so acting as elevens), in spite of the relatively short moment arm. Consequently, a conventional tail surface may be omitted. Wing tip fences may be provided, which may comprise actuators to provide yaw control. Consequently, a conventional vertical tail surface could also be omitted, while maintaining longitudinal static stability. In view of the relatively close spacing of the engines relative to the centre of mass, adverse yaw in the event of an engine failure is minimised. Consequently, the minimum control speed for the aircraft is adequate, in spite of the lack of a conventional vertical tail.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the aircraft could comprise a conventional tube and wing aircraft. The aircraft could comprise a larger number of engines, such as in a distributed propulsion aircraft. Alternatively, a relatively small number of engines (such as two) could be provided, with each engine providing power for a plurality of propulsors such as electrically driven propellers, in an arrangement similar to applicant's co-pending UK patent application EP14192431.6, incorporated herein by reference. In such a case, the propulsors (which would be regarded as being safety critical aircraft components) would be located at locations on the fuselage and/or wing such that the planes of rotation of the engines do not intersect with the propulsors. The engines could be located in different regions, such as at the leading edge of the transition region, or trailing edges of the wing.

Aspects of any of the embodiments of the invention could be combined with aspects of other embodiments, where appropriate.

The invention claimed is:

1. A blended wing body or a flying wing aircraft having a longitudinal axis and comprising:
    at least two gas turbine engines arranged in a line generally normally to the aircraft longitudinal axis in the horizontal plane and substantially coincident with at least one of an aircraft center of mass and an aircraft center of lift, and having a longitudinal axis and comprising at least one compressor or turbine rotor disc defining a respective rotational plane normal to the longitudinal axis, wherein each engine longitudinal axis is angled relative to the aircraft longitudinal axis such that a rotational plane of the compressor or turbine rotor disc of each engine is nonintersecting with the other engine; and
    at least one duct arrangement comprising an intake duct leading from an air inlet to an intake of a respective engine, and an exhaust duct leading from an exhaust of the respective engine to an exhaust outlet, wherein the intake duct transitions from a direction generally parallel to the aircraft longitudinal axis at the air inlet, to a direction generally parallel to the respective engine longitudinal axis at the intake, and the outlet duct transitions from a direction generally parallel to the respective engine longitudinal axis at the exhaust of the respective engine, to a direction generally parallel to the aircraft longitudinal axis at the exhaust outlet.

2. An aircraft according to claim 1, wherein the engines are located at a trailing edge of the fuselage of the aircraft.

3. An aircraft according to claim 1, wherein the engines are mounted at a point of transition between the fuselage and wings.

4. An aircraft according to claim 1, wherein the engines are located within the aircraft wing or fuselage.

5. An aircraft in accordance with claim 1, wherein the aircraft comprises at least two redundant control runs for at least one aircraft control surface, wherein one control run extends along a first side of an engine, and a further control run extends along a second side of the respective engine.

6. An aircraft according to claim 1, wherein the air inlet of the or each intake duct is located at a leading edge of the point of transition between the fuselage and wings.

* * * * *